Aug. 18, 1970     C. H. BYERS     3,524,238

METHOD OF FABRICATING A TUYERE ELBOW

Filed Sept. 27, 1967     3 Sheets-Sheet 1

FIG. I

INVENTOR.
CHARLES H. BYERS

BY
*Fay, Sharpe & Mulholland*
ATTORNEYS

Aug. 18, 1970     C. H. BYERS     3,524,238

METHOD OF FABRICATING A TUYERE ELBOW

Filed Sept. 27, 1967     3 Sheets-Sheet 3

FIG. 7(a)

DEVELOPING THE PATTERN OF THE FRUSTUM OF A CONE ON A STEEL PLATE CUTTING THE PLATE

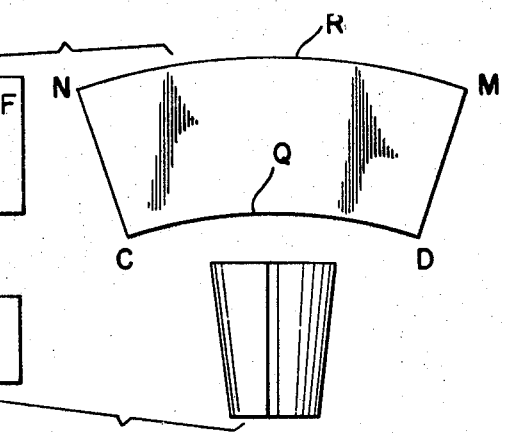

FIG. 7(b)

FORMING THE FRUSTUM OF A CONE

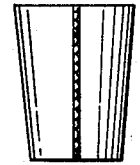

FIG. 7(c)

JOINING THE ADJACENT EDGES

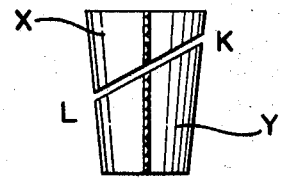

FIG. 7(d)

CUTTING THE FRUSTUM INTO FIRST & SECOND ELEMENTS

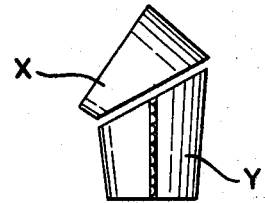

FIG. 7(e)

ROTATING THE FIRST ELEMENT 180° WITH RESPECT TO THE SECOND ELEMENT

FIG. 7(f)

JOINING THE FIRST & SECOND ELEMENT

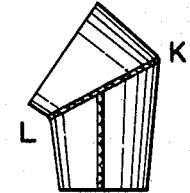

FIG. 7(g)

SECURING A FLANGE AND BEARING SEAT

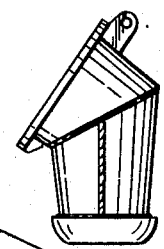

INVENTOR.
CHARLES H. BYERS

BY
*Fay, Sharpe & Mulholland*

ATTORNEYS

United States Patent Office 3,524,238
Patented Aug. 18, 1970

3,524,238
METHOD OF FABRICATING A TUYERE ELBOW
Charles H. Byers, Youngstown, Ohio, assignor to
The Scholl-Choffin Company
Filed Sept. 27, 1967, Ser. No. 670,901
Int. Cl. B21d 53/00
U.S. Cl. 29—157                                           2 Claims

ABSTRACT OF THE DISCLOSURE

A method of fabricating tuyere elbows for repair and replacement of existing elbows in a blast furnace or the like. The tuyere elbow is fabricated by first developing the pattern of the frustum of a cone on steel plate stock. Having developed the pattern, the plate is cut and the frustum of a cone is formed with the adjoining edges secured together to form thereby a continuous frusto-conical surface. A substantiallly planar cut is then made in the frustum thereby separating said frustum into first and second elements. Thereafter, the first element is rotated 180° with respect to the second element and, with their adjacent edges abutting, the first and second elements are secured together. The fabrication of the tuyere elbow is completed by securing a flange to the first element and a spherical bearing seat to the second element.

BACKGROUND OF THE INVENTION

In a modern blast furnace, iron oxides and ore are reduced to produce liquid metallic iron. This iron is a major component in the integrated plant for the manufacture of iron and steel. The blast furnace is a cylindrical, vertical shaft which is divided essentially itno four main sections: the hearth, the bosh, the stack, and the top. The hearth or crucible is the lowest part of the interior and is of cylindrical shape. It is in this part that the liquid iron and slag collect between casts and flushes. Above the hearth are the tuyeres, which are regularly spaced around the circumference. Tuyeres are water cooled, copper castings, four to seven inches in diameter, through which the preheated air blast, required for the combustion of fuel, is blown into the furnace. There are usually 8 to 16 tuyeres in a blast furnace, but in some very large furnaces there may be as many as 26. A tuyere cooler supports the tuyere in the wall of the blast furnace. For different furnaces in the same plant, the length and diameter of the tuyeres may be different but in all cases they are designed to fit inside the same tuyere cooler casting. A horizontal cast iron pipe called the blow pipe, about five feet long and with one end fitting closely against the tuyere, carries hot blasts from the tuyere stock to the tuyere, thence into the furnace. The tuyere stock generally comprises a lower and upper elbow joined together. The tuyere stock curves upward on leaving the blow pipe to fasten to a neck extending radially from the inside diameter of the bustle pipe. The bustle pipe is a large, circular, refractory-lined and insulated pipe which encircles the furnace at about the mantle level and equally distributes the heated blast from the hot blast main to each tuyere connection.

Although the tuyere stock is lined with refractory material as protection against the heat of the blast, the intense heat of the blast furnace necessitates periodic replacement of the tuyeres, and the tuyere elbows comprising the tuyere stock. Tuyere elbows of the prior art are steel castings approximately one inch thick and weighing on the order of 1,000 pounds each. The usual practice, therefore, is to replace a cast steel tuyere elbow with another cast steel tuyere elbow when required. The use of cast steel replacement tuyere elbows is necessarily expensive for a number of reasons. As was previously pointed out, the casting is large; on the order of 1,000 pounds in weight. Since the casting includes an integral flange and spherical bearing seat, the casting is unique to a particular blast furnace and is not readily reproducible. Further, the manufacture of a replacement steel casting for use as a tuyere elbow requires the formation of suitable patterns and molds as well as finish cleaning and machining.

This invention is directed to a method of fabricating tuyere elbows for use in blast furnaces as replacements for the cast tuyere elbows. The material used in the fabrication of the tuyere elbow of this invention is alloy steel plate stock approximately one-half inch in thickness. Through the method taught by this invention, plate stock is fabricated into a tuyere elbow compatible with the steel cast elbow of the prior art but significantly lower in cost. Further, this invention teaches a greatly simplified method of manufacturing a replacement tuyere elbow for a blast furnace, which method may be practiced by most metal working shops. The necessity of forming a mold for a casting operation has been eliminated. The method of this inventon will permit a wide variety of tuyere elbow sizes to be fabricated with little extra investment in equipment required. The necessity of casting each individual elbow size in its individual mold has been eliminated.

Briefly described, this invention is directed to a method of fabricating tuyere elbows for use in a blast furnace which method comprises the steps of first developing the pattern of the frustum of a cone on a steel plate. The plate is then cut into the shape of the pattern and is thereafter formed into a frusto-conical figure. A cut is then made in the frustum thereby separating the frustum into at least two elements. One of said elements is rotated 180° with respect to another of said elements and adjoining edges are brought into contact to define a bend. The elements are then joined together. Fabrication is completed by securing an end flange to one end of said bend and a spherical seat to the other end of said bend.

For a better description of the invention, reference is now made to the attached drawings in which.

FIG. 7(a)–(g) is a block diagram illustrating the method steps of this invention.

DESCRIPTION OF THE INVENTION

Figure 1:
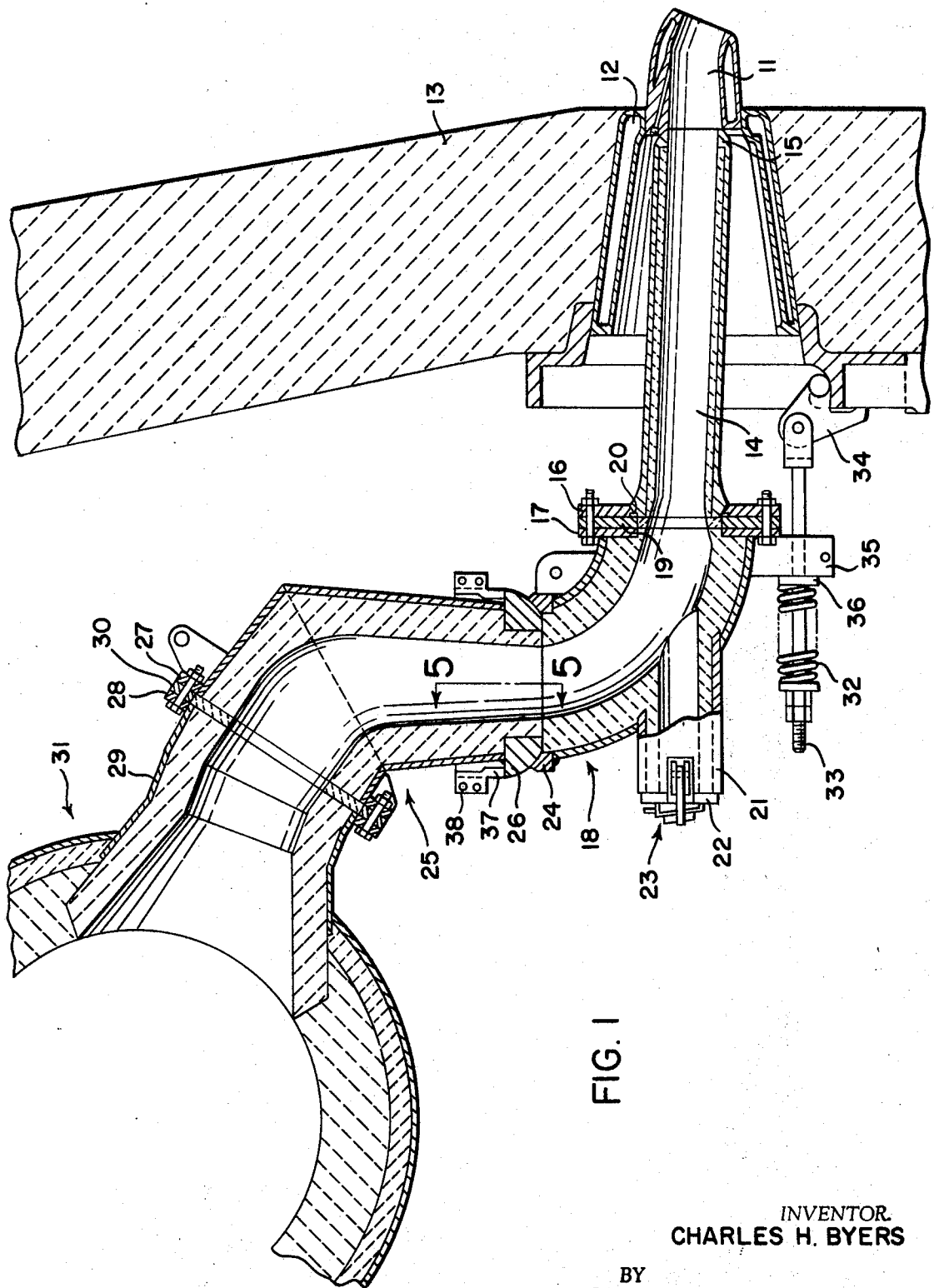
FIG. 1 is a cross-sectional elevational view of a portion of a blast furnace and showing a tuyere, tuyere stock including a top and bottom elbow and a bustle pipe.

Reference is now made to FIG. 1 wherein there is shown a cross-sectional view of the hearth wall of a large blast furnace. A tuyere 11 is supported by a tuyere cooler 12 disposed within the hearth wall 13. A cast iron blow pipe 14 has a nose portion 15 abutting tuyere 11. A flange seat 16 is welded or otherwise secured to the outer end of the blow pipe 14 in order to provide a suitable connection for a similar flange seat 17 of the bottom elbow 18. A filler 19 is interposed between flange seats 16, 17. A seat insert 20 may be disposed between filler 19 and flange seat 16. The bottom elbow 18 is provided with a tubular extension 21 which is located on the center line of the blow pipe 14. A small glass covered opening or peep hole is provided in the cover 22 of the extension 21. The purpose of the peep hole or eyesight is to permit the inspection of that portion of the interior of the furnace directly in front of the tuyere. A suitable eyebolt and key 23 is provided to lock the cover 22 in a closed position. In the event that cleaning of the tuyere 11 is desired, a small rod may be inserted within the tubular extension 21 and blow pipe 14 after removal of the cover 22. The upper portion of the elbow 18 is provided with a spherical bearing seat 24 for the purpose of engaging a complemental bearing seat 26 of the upper elbow 25. Bearing seats 24, 26 provide constant sealing engagement of the elbows 18, 25 in spite of radial and/or longitudinal expansion of the elbows when heated.

The upper elbow 25 is a reducing elbow having a decreasing diameter throughout its length. A spherical bearing seat 26 is provided at one end of elbow 25 and a flange seat 27 is provided at the opposite end. Flange seat 27 is adapted to engage a complemental flange seat 28 of neck 29. A filler 30 is interposed between the flange seats 27, 28. Neck 29 extends radially from bustle pipe 31.

As was previously pointed out, the bustle pipe 31 is a large, circular, refractory-lined and insulated pipe which encircles the furnace at about the mantle level and equally distributes the heated blast from the hot blast main to each tuyere connection. Neck 29, upper elbow 25, bottom elbow 18, and blow pipe 14, therefore, define a conduit for the flow of heated air from the bustle pipe 31 to the tuyere 11. It is to be understood that suitable fasteners may be disposed within the holes provided in the flange seats 27, 28 and 16, 17 for joining the respective elements of the conduit between the tuyere and the bustle pipe. The blow pipe 14 is held in place by a heavy spring 32 and tension rod 33. Tension rod 33 extends from a hook 34 secured to the wall 13 of the blast furnace. Tension rod 33 passes between adjacent ear-like projections 35 of the bottom elbow 18. Spring 32 bears against washer 36 abutting projections 35. The tension rod 33 and spring 32 thus allow limited motion due to expansion and contraction of the upper elbow 25, bottom elbow 18 and blow pipe 14 with changes in blast temperature.

Figure 5:
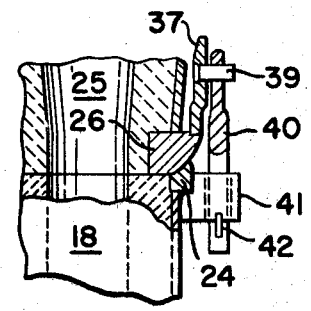
FIG. 5 is a sectional view taken along the line 5—5 of FIG. 1.

The interconnection between the upper elbow 25 and the bottom elbow 18 is more clearly shown in FIG. 5. A pair of half rings 37 having flanges 38 (FIG. 1) are interconnected at flanges 38 to define a single continuous ring disposed about the upper elbow 25 and resting on a seat of the bearing seat 26. A pair of holes, spaced approximately 180° apart, are provided in the half rings 37 for the purpose of receiving pins 39. An eyebolt 40 is pivotally secured to each pin 39. Eyebolt 40 extends through a passage in the connector block 41 which is welded or otherwise secured to the external surface of the bottom elbow 18. A key 42 is disposed within a slot of the eyebolt 40 and is wedged between the connector block 41 and the end of the eyebolt 40. This wedging action serves to draw the bearing seats 24, 26 into tight abutment thereby providing a seal between the upper elbow 25 and the bottom elbow 18. A support for the bottom elbow 18, when assembling the tuyere stock, may be provided by means of a conventional chain assembly (not shown).

Having briefly described the function of a tuyere in a blast furnace along with the associated tuyere stock and the bustle pipe, attention is now directed in particular to the upper tuyere elbow 25. This invention is directed to a method of fabricating the tuyere elbow 25 as shown in FIG. 1. The bottom elbow 18 may be either cast or fabricated by conventional methods. Elbow 18 is generally uniform in cross-section having a constant inner diameter in a plane normal to the arc of the bend. This constant diameter is to be differentiated from the varying diameter of the upper elbow 25 which prohibits application of conventional fabrication techniques.

Figure 2:
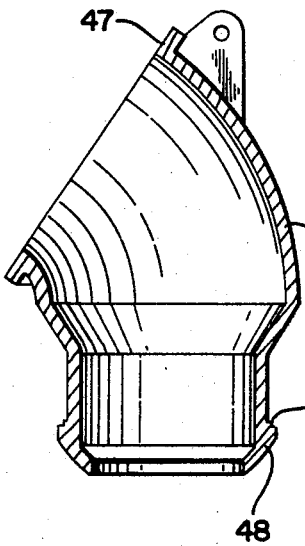
FIG. 2 is a cross-sectional elevational view of a tuyere elbow of the prior art.

FIG. 2 illustrates an upper tuyere elbow as fabricated by the casting technique of the prior art. The elbow of FIG. 2 includes a body portion 46, an integral flange seat 47, and an integral, spherical, bearing seat 48. A ring seat 49 is defined in the upper portion of the bearing seat for the purpose of receiving the ring 37 as shown in FIG. 1. To give an example of size, the casting of FIG. 2 will weigh approximately 1,000 pounds. The diameter of the casting of FIG. 2 will be approximately 26 inches in the vicinity of the flange seat 47 and decrease to approximately 20 inches in the vicinity of the spherical bearing seat 48. The wall thickness of the body 46 will be on the order of 1 inch.

Figure 3:
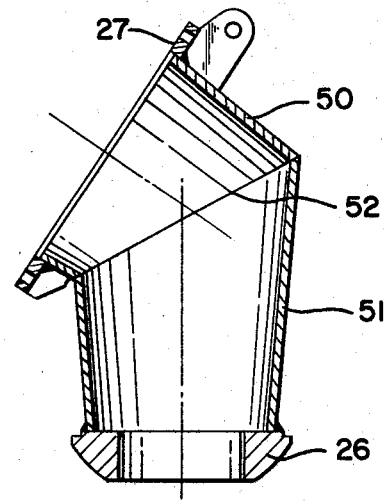
FIG. 3 is a cross-sectional elevational view of a tuyere elbow interchangeable with the elbow of FIG. 2 and fabricated by the method of this invention.

The interchangeable tuyere elbow of this invention is shown in FIG. 3. A pair of steel plate elements 50, 51 are joined along a plane of joinder 52. The flange seat 27 is provided at one end of element 50 and spherical bearing seat 26 is provided at one end of element 51. Welding or other suitable connecting means may be used to secure the elements and the respective flange and seat.

Figure 4:
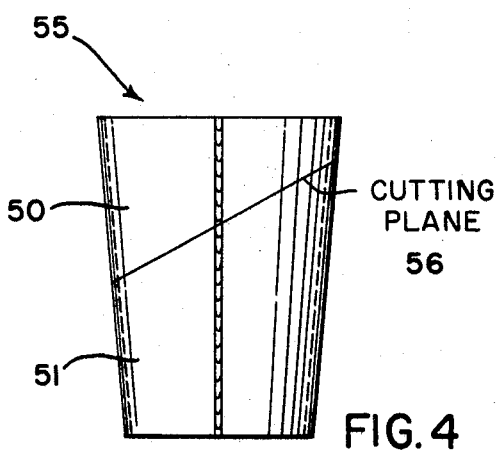
FIG. 4 is an elevational view of a frustum of a cone from which the tuyere elbow of FIG. 3 is fabricated.

Elements 50, 51 of FIG. 3 are formed from a single conical frustum 55 as shown in FIG. 4. A frustum of a cone is traditionally defined as that portion of a cone lying between the base and a plane parallel to the base. The line segment joining the centers of the bases of the frustum of a circular cone is called the axis. When a plane perpendicular to the axis of a conical frustum intersects said frustum, the figure formed is a circle. If the intersecting plane is not perpendicular to the axis but intersects all of the elements of the frustum, the section defined is an ellipse. If the cone from which the conical frustum is defined is a right cone, the ellipse formed by the intersection of a plane and the frustum is a symmetrical ellipse. By symmetrical is meant that the ellipse is symmetrical about two axes, i.e., the major axis and the minor axis.

If the conical frustum of FIG. 4, therefore, should be cut by a cutting plane 56, a pair of elements will be formed having adjacent symmetrical, elliptical surfaces. That part of the conical frustum above the cutting plane 56 may be rotated 180° with respect to the lower element 51 and in an edge-to-edge position will form a perfect joint with the lower element. The resulting figure, as is shown in FIG. 3, will be an elbow having a decreasing diameter from a first end to a second end.

METHOD STEPS

The method of fabrication of a tuyere elbow as taught by this invention will now be described with reference to FIGS. 6 and 7.

Figure 6:
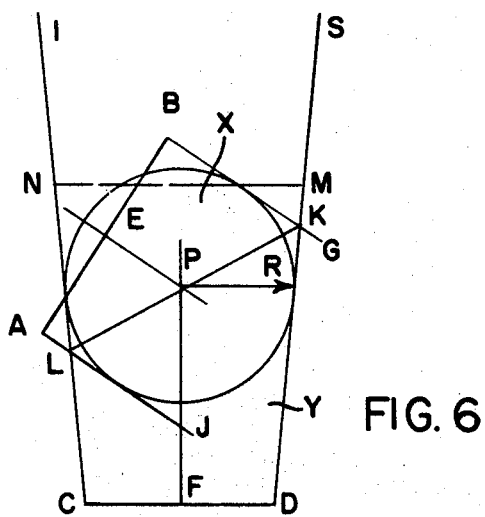
FIG. 6 is a schematic representation of the development of the planar pattern of FIG. 7(a)

DEVELOPING THE PATTERN CUTTING THE PLATE, FIG. 6, FIG. 7(a)

Since the fabricated tuyere elbow is to be secured to the neck 29 of a fixed bustle pipe 31 and the spherical bearing seat 24 of the bottom elbow 18, the planes of the end circles of the tuyere elbow as well as the diameters of the end circles of the tuyere elbow are known prior to fabrication and may be drawn as shown in FIG. 6. Thus, the lines AB and CD represent the respective planes and diameters of the end circles of the tuyere elbow to be fabricated. The axes EP and FP of the end circles may then be drawn. These axes intersect at P. The line DS is drawn at an angle to the line CD equal to the desired taper in the elbow. Next, a circle is drawn having a radius PR. Lines are then drawn from the respective ends of lines AB, CD tangent to the circle. In FIG. 6, these lines are respectively AJ, BG, CI, and DS. The points of intersection of adjacent tangent lines may now be plotted as L and K. The geometrical development of the tuyere elbow has now been completed showing a pair of elements X, Y joined along a plane of joinder LK. Now, the elements X, Y, comprising the elbow are to be transformed into a single conical frustum for purposes of developing a planar pattern. Since the element X of FIG. 6 has been rotated 180° with respect to the element Y in order to define an elbow, the distance AL is added to the line DK to produce a new line having a length equal to the sum of the lines DK and AL. This new line is shown as line DM in FIG. 6. Correspondingly, a line CN is developed which is the sum of the line CL and KB. A conical frustum has thus been defined by parallel planes NM and CD. The slant height of the frustum is DM.

It is now possible to visualize the development of the conical frustum of FIG. 6 as a planar surface as if the surface were unrolled or unwrapped from the conical frustum. This planar development of a conical frustum is shown in FIG. 7(a) wherein the elements of the frustum are equal in length and define the spacing between arcs Q and R. The arc Q is equal in length to the circumference of the end circle with diameter CD (FIG. 6). The arc R is equal in length to the circumference of the end circle with diameter NM or AB (these lines being equal).

The planar pattern of the conical frustum has now been developed and this pattern may now be transferred to or scribed on a steel plate or other suitable material for purposes of fabricating a tuyere elbow.

Having scribed the pattern on the plate, the plate is then cut into the shape of the pattern. As used herein the word "develop" shall mean the physical steps required to produce a pattern in a tangible form that may be transferred to or scribed on a steel plate.

FORMING THE CONICAL FRUSTUM, FIG. 7(b)

With the steel plate cut into the pattern of FIG. 7(a), a conical frustum may then be formed by joining the end surfaces CN and DM. This forming operation may be performed by means of a large roll or other forming apparatus well known to those skilled in the art.

JOINING THE ADJACENT EDGES

Having formed a conical frustum, the adjacent edges CN and DM may be joined by means of a seam weld or other fastening means well known to those skilled in the art.

CUTTING THE FRUSTUM INTO FIRST AND SECOND ELEMENTS, FIG. 7(d)

The conical frustum is now cut into first and second elements along a cutting plane LK. It should be emphasized that the cut is a substantially planar cut defined by the intersection of a plane and the conical frustum at an angle not perpendicular to the axis of the frustum but intersecting all of the elements of the frustum. By substantially planar is meant that within the limits of human tolerance of shop practice and the customary cutting methods employed by those skilled in the art, the cut will lie substantially in a plane.

ROTATING THE FIRST ELEMENT 180° WITH RESPECT TO THE SECOND ELEMENT, FIG. 7(e)

Having cut the conical frustum into two elements, the element X is now rotated 180° with respect to the element Y and said elements are brought together into abutting relation. It should be noted that a perfect joint will be formed as the intersection of the plane LK and the conical frustum is a symmetrical ellipse, i.e., symmetrical about the major and minor axes.

JOINING THE FIRST AND SECOND ELEMENTS

The elements X and Y are now joined along a plane of joinder LK. A weld or other suitable attaching means may be utilized to join the elements X and Y along the planar transverse surface LK.

SECURING A FLANGE AND BEARING SEAT, FIG. 7(g)

The fabrication of the tuyere elbow is completed with the securing of a flange seat such as is shown at 27, FIG. 3 to element X (50, FIG. 3) and the securing of a spherical bearing seat, such as is shown at 26, FIG. 3, to the element Y (51, FIG. 3). A weld or other suitable attaching means well known to those skilled in the art may be utilized for this purpose.

After lining with suitable refractory material, the tuyere elbow is now ready to be attached to the neck 29 of bustle pipe 31 and the bottom elbow 18. As was previously pointed out, the flange seat 27 is joined to the flange seat 28 of neck 29 by means of fasteners disposed within suitable holes. The connection between the tuyere elbow 25 and the bottom elbow 18 is accomplished by means of the eyebolt 40 and key 42 as shown in FIG. 5. The upper end of the eyebolt 40 is pinned to ring 37 whereas the bottom portion of the eyebolt 40 extends through a connector block 41. Key 42 is wedged between the eyebolt and the connector block 41 to bring the mating spherical seats 24, 26 into sealing engagement.

SUMMARY OF THE INVENTION

This invention is directed to a method of fabricating a tuyere elbow for the purpose of effecting repair of the tuyere stock of a blast furnace by replacement of the original cast tuyere elbow. The method comprises the steps of first developing the pattern of a frustum of a cone on a steel plate and thereafter forming the frustum of a cone from steel plate stock. After joining the abutting edges of the conical frustum, the frustum is cut along a cutting plane into first and second elements. One of the elements is rotated 180° with respect to the other element and said elements are thereafter joined to thereby form a tapered elbow or bend. An end flange and a bearing seat are then secured to the tapered elbow to define a fabricated tuyere elbow compatible with a cast tuyere elbow.

ADVANTAGES OF THE INVENTION

The fabrication method of this invention may be practiced to efficiently produce a replacement tuyere elbow for a blast furnace. The replacement elbow so produced is considerably below the cost of a comparable cast elbow. The fabrication method of this invention may be practiced by a metal working shop. The necessity for elaborate pattern and mold making equipment has been eliminated. The fabrication method of this invention can produce many sizes of tuyere elbows without the necessity of producing a particular pattern or mold for a particular size as is the requirement of a casting process.

EXTENDED SCOPE OF THE INVENTION

Throughout the description of the method of fabricating a tuyere elbow of this invention, reference has been made to a repair of tuyere stock through substitution of a fabricated tuyere elbow for a cast tuyere elbow. In its broadest sense, this invention is directed to a fabrication method for producing a tuyere elbow whether or not such elbow is utilized for repair purposes or as original equipment in a blast furnace. Further, whereas the preferred embodiment of this invention resides in the environment of a blast furnace, this invention should be considered as broadly relating to the art of fabricating a tapered elbow.

Since a blast furnace requires heavy gauge metal in the tuyere stock, the description of this junction has been with reference to ½ inch steel plate. Other thicknesses should be considered within the scope of this invention as well as a variety of materials not necessarily limited to steels.

The tuyere elbow of the preferred embodiment is defined by two elements joined together. This invention should not be limited to two elements as an elbow may be defined by a plurality of elements each cut from a single frustum or a plurality of frustums. The claims should, thus, be construed as broadly covering a method of fabricating an elbow wherein at least two elements are cut from a single frustum.

In FIG. 6 there has been described one method of developing the planar pattern of FIG. 7(a). Within the realm of descriptive geometry there are other methods of developing the planar pattern of FIG. 7(a) and this invention should not be considered as limited to the teaching of FIG. 6.

Nor should this invention be limited to the method of forming the frustum of a cone by first developing the pattern of the frustum on a planar surface. Since metal is relatively easy to roll, it is convenient to start with a planar pattern and form a frustum by rolling. However it is possible to form a frustum in other ways such as by spinning metal. Therefore, this invention should not be considered as limited to the particular method of forming the conical frustum as shown in FIG. 7(a).

As a logical extension of this invention, consideration should be given to the fabrication of tapered elbows by the formation of geometrical figures other than the frustum of a cone. The method of this invention is broadly applicable to any geometrical figure having a varying transverse dimension and in which a cutting plane defines a figure symmetrical about at least two axes thereby permitting one cut section of the geometrical figure to be rotated with respect to another cut section to thereby define a bend or elbow. With two axes of symmetry the rotation of one element with respect to another will be 180°. With three axes of symmetry the rotation will be 120°. A star is symmetrical about five axes and a 72° rotation of one element with respect to another will produce a perfect joining of the elements.

What is claimed is:

1. A method of fabricating a tuyere elbow for a blast furnace or the like comprising the steps of:
    (a) developing the planar pattern of the frustum of a cone on a steel plate, said pattern including a first and second arc the length of each being respectively equal to the circumference of the end openings of the tuyere elbow to be fabricated, said arcs being separated by a distance equal to the slant height of of the frustum of a cone from which the tuyere elbow is to be fabricated;
    (b) cutting said plate into the shape of said pattern;
    (c) forming said plate into a frustum of a cone;
    (d) welding adjacent edges of said plate;
    (e) cutting the frustum in a substantially planar surface which intersects all of the elements of said frustum at an angle not normal to the axis of said frustum, said cutting thereby defining first and second elements;
    (f) rotating said first element 180° with respect to said second element and thereafter bringing said elements into edge-to-edge contact in the plane of the cut to define a bend;
    (g) welding adjacent edges of said elements;
    (h) welding an end flange to the outer end of said first element and welding a spherical bearing seat to the outer end of said second element.

2. The method of claim 1 and further including the method step of:
    lining the interior walls of said elbow with refractory material.

References Cited

UNITED STATES PATENTS

| | | | |
|---|---|---|---|
| 837,966 | 12/1906 | Schuiling | 113—116 |
| 1,573,448 | 2/1926 | Purnell | 29—425 X |
| 3,111,922 | 11/1963 | Hock | 113—116 |

JOHN F. CAMPBELL, Primary Examiner

D. C. REILEY, Assistant Examiner

U.S. Cl. X.R.
29—425; 113—116